United States Patent
Purtell

[11] 3,897,801
[45] Aug. 5, 1975

[54] STRETCH PIPE IRRIGATION SYSTEM
[75] Inventor: Rufus J. Purtell, Brownfield, Tex.
[73] Assignee: Tri-Matic, Inc., Brownfield, Tex.
[22] Filed: Oct. 11, 1974
[21] Appl. No.: 514,121

[52] U.S. Cl.................................. 137/344; 239/212
[51] Int. Cl.² ............................................ B05B 3/18
[58] Field of Search ........... 239/172, 175, 177, 178, 239/212, 213; 137/344

[56] References Cited
UNITED STATES PATENTS 3,381,894   5/1968   Purtell .......................... 239/177 X
3,394,729   7/1968   Bower et al..................... 239/212 X
3,628,729   12/1971  Thomas .......................... 137/344 X

*Primary Examiner*—M. Henson Wood, Jr.
*Assistant Examiner*—Andres Kashnikow
*Attorney, Agent, or Firm*—Wendell Coffee

[57] ABSTRACT

The pipe of an irrigation system is stretched so that when moved the vehicles are maintained in line. The stretching is accomplished by angling the wheels outward on the vehicles at each end.

8 Claims, 3 Drawing Figures

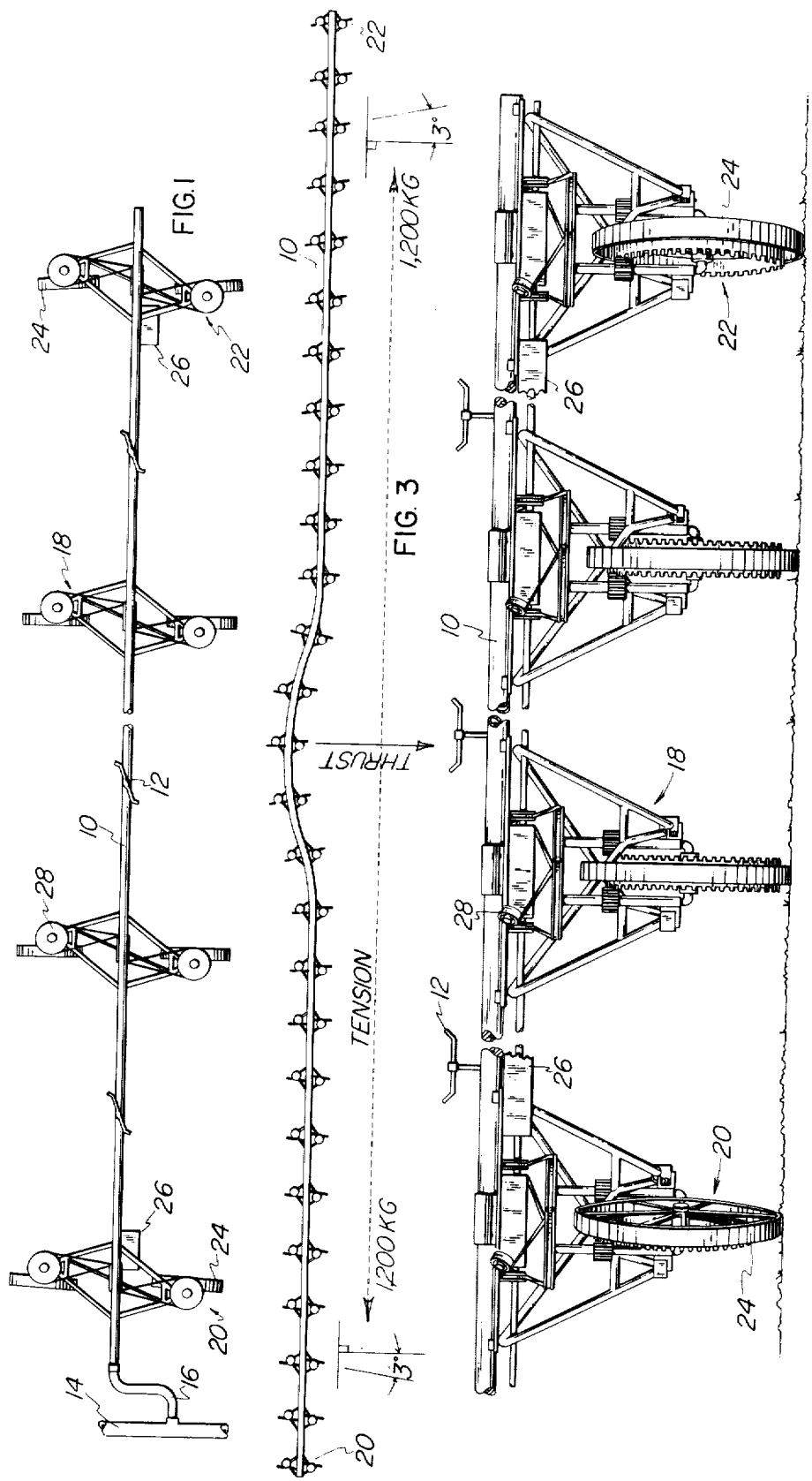

STRETCH PIPE IRRIGATION SYSTEM

BACKGROUND OF THE INVENTION

1. Field of the Invention

This invention relates to agricultural irrigation and more particularly to aligning elongated irrigation pipes.

2. Description of the Prior Art

In has been recognized in the field of irrigation that the pipe must be maintained straight or nearly so. Various systems have been disclosed to accomplish this. E.g., ZYBACH, U.S. Pat. No. 2,941,727, detected misalignment by a series of cables extending across the vehicles. Misalignment was corrected by throttling the fluid to fluid motors on vehicles. BONDS ET AL., U.S. Pat. No. 3,606,160 and BOWER ET AL., U.S. Pat. No. 3,394,729, taught that the angle of misalignment at any one vehicle could be measured by having a cable wound around a pulley and an on-off switch for an electric motor used.

In my prior patents, U.S. Pat. Nos. 3,373,936 and 3,381,894, I suggested that a stiff arm could be attached to the pipe and the bend of the pipe measured. This measurement is used to adjust the transmission of power to each vehicle. I also suggested in U.S. Pat. No. 3,417,766 that a drive shaft could be mounted on the same level as the pipe and the difference in the length of the two utilized to detect and correct misalignment by use of variable speed transmission. BOONE, U.S. Pat. No. 3,302,656, taught that a chalk line could be stretched from one end of the system to the other and each vehicle brought into alignment with the taut line.

Also, my prior patent, U.S. Pat. No. 3,844,308 issued on Oct. 29, 1974, shows that the speed of the end vehicles may be controlled from a central station upon the system.

There is conflicting teaching in the prior art as to whether the pipe should be under tension or not. BOONE, U.S. Pat. No. 3,612,092, Col. 4, line 15, states that it is advantageous to have tension on the pipe, but it does not state for what reason. This is contrasted to BONDS ET AL., U.S. Pat. No. 3,606,160, which states that it is important to minimize stresses in the pipeline, Col. 2, line 58. BOONE says he would use other means to maintain the system in alignment, thus, the pipe tension is not an alignment means.

It will be noted that in each and every case, there is a definite change in the speed of the drive to the vehicle to maintain alignment. I.e., it is either an on-off device or a change in the amount of power or ratio to drive to the vehicle. There is always a desire for a less expensive device that is simpler and requires fewer moving parts and "trigger work."

SUMMARY OF THE INVENTION

1. New and Different Function

I have discovered that the system may be maintained in line by stretching the pipe taut. It will be understood that there will normally be a certain amount of slippage with each driving vehicle. This is particularly true when trail tubes are used. Therefore, if the pipe is taut and a vehicle is behind, it will helped to be pulled forward. On the other hand, if the vehicle is forward, it will try to pull the two side vehicles forward and, also, it, itself, will be held back. E.g., if the pipe has 500kg tension upon it and the vehicles are 15 meters apart and one vehicle is 150 millimeters out of line with respect to its two adjacent vehicles, analysis will show that it will have a 10kg force upon it to bring it into line. I.e., if it is behind, it will have a 10kg pull to help bring it forward, this is in addition to its normal drive. Also, if it is forward, it will have a 10kg drag on it to bring it back in line.

When it is understood that, normally, a system is not considered to be particularly "out of line" unless a vehicle is one row (one meter) behind the adjacent vehicles, analysis will show at that point if there is a 1200kg stretch or tension upon the pipe, there will be 160kg force upon it to bring it into line.

The stretch of the pipe is accomplished by the simple expedient of having wheels on the end vehicles on each end angling out slightly.

Therefore, it may be seen that the vehicles of the system may be maintained in line without any additional or special equipment to detect misalignment and without any trigger work or special mechanism to adjust the speed of the vehicles responsive to the detection of misalignment.

OBJECTS OF THE INVENTION

An object of this invention is to maintain agricultural irrigation systems in alignment.

Further objects are to achieve the above with equipment that is sturdy, compact, durable, lightweight, simple, safe, efficient, versatile, and reliable, yet inexpensive and easy to manufacture, install, adjust, operate and maintain.

Other objects are to achieve the above with a method that is versatile, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 1 is a top plan view of an agricultural irrigation system showing an embodiment of my invention. The figure is schematic and many of the intermediate vehicles are not shown for clarity.

FIG. 2 is a front view thereof with vehicles omitted for clarity.

FIG. 3 is a schematic top plan view showing another embodiment of the invention.

DESCRIPTION OF THE PREFERRED EMBODIMENTS

As seen in the drawing, lateral main moveable elongated pipe 10 has a plurality of sprinklers 12 thereon. The pipe 10 is supplied by water from a source of water under pressure in the form of pipe 14. The connection between the moveable pipe 10 and the source 14 is illustrated as flexible hose 16. The movable pipe 10 is supported by a plurality of intermediate vehicles 18 and end vehicles 20 and 22. Each of the vehicles 18, 20, and 22, is driven in any of a number of conventional manners as is well known to the art. As illustrated, each vehicle has power means 28 for moving the vehicle. Each vehicle has ground engaging elements in the form of wheels. It will be understood that the equipment specifically described to this point is old, well known and commercially available on the market.

I maintain this system in alignment by angling wheels 24 on the end vehicles 20 and 22 outward or away from the center of the pipe. The wheels 24 are angled out by about three or four degrees. I have found that this rather small angle puts a greater tension on the pipe 10 than a larger angle. E.g., if about a 6° angle out is put on the wheels, this causes the wheels to disturb the soil more, to act somewhat like a plow, but, still, not stretch the pipe as much as if a smaller angle, in the order of three or four degrees, is placed upon the wheels 24. With this angle upon the wheels and the pipe stretched, I have found that it maintains the pipe 10 and intermediate vehicles 18 in alignment.

I have found it desirable to have a speed control 26 upon the end vehicles 20 and 22. Although any of a number of different types of speed control could be used, I prefer to use a control by a central station as is shown in my U.S. Pat. No. 3,844,308 issued on Oct. 29, 1974.

As a matter of design and construction, it will be understood that as the end vehicle 22 is angled away at the ground level, it will tend to bend the pipe 10 downward between the end vehicle and its adjacent vehicle 18. A downward bend of the pipe may be limited so damage is prevented by two simple methods. I prefer to place the spacing between the end vehicle and the next adjacent vehicle to a shorter distance and use heavier, thicker, stronger pipe between the end vehicle and the next adjacent vehicle. I.e., the normal spacing between vehicles being about 15 meters, the distance between the end vehicle and its adjacent vehicle is only about 12 meters and, also, normally the pipe of 1.5 millimeter wall thickness is used, but the wall thickness adjacent to the end vehicle is of 2.0 millimeter thickness.

The other expedient readily usable is to make a four-wheeled vehicle at the end. I.e., instead of having a standard two-wheeled vehicle, two standard two-wheeled vehicles are mounted adjacent to one another spaced about 3 meters apart. This forms a stable vehicle which prevents the downward bend on the pipe between the end vehicle and the next adjacent vehicle. If vehicles such as are shown in my U.S. Pat. No. 3,381,894, particular reference to FIGS. 5 and 6 are used, it is a simple matter to angle the wheels outward, as described in Col. 3, line 13. However, otherwise it is well within the skill of any ordinary mechanic having the ordinary skills relating to irrigation pipe movement to angle the end wheels outward.

Instead of angling the wheels relative to the vehicle, the entire vehicle could be angled relative to the pipe.

FIG. 3 illustrates that not only the wheels of the end vehicles 20 and 22 could be angled out, but also several of the vehicles adjacent to the end. Specifically there illustrated, a system using approximately 26 vehicles spaced 15 meters apart for about 380 meters in length. The embodiment shown in FIG. 3 has only eight vehicles on one end set with their wheels angled outward at 3°. Also, as shown, about one-third, or eight vehicles on the other end are set with their wheels angled outward. About one-third or 10 of the middle vehicles are with their wheels set straight forward. Of course the amount of tension placed on the pipe 10 by each vehicle will vary according to the weight on the wheels. Probably about 150kg tension is placed on the pipe with each vehicle. I.e., between the third and fourth vehicle on the end, there will be a force of about 450kg and at the center of the pipe there will be about 1200kg on the pipe.

Although this system of alignment is operative if only the wheels on the end vehicles are angled outward, for a commercial practice of the invention, it is desirable if at least one-fourth of the vehicles (i.e., seven on a 26 vehicle system) on each end are angled outward.

It will be understood that in the operation of the system, the vehicles in the center where the wheels are placed straight forward have sufficient tension so they will tend to remain in line. If a vehicle close to the end gets out of line, it can easily be brought in line by the end vehicle. E.g., Assume that the third vehicle from the end gets behind. As discussed above, the tension on the pipe from one side of the third vehicle would be about 300kg and the tension on the other side about 450kg. This is enough tension to reasonably well keep the vehicle in line. However, it will be understood that if it were to fall behind, it could be brought up by speeding up the end vehicle with the speed control 26. It will be understood that when the end vehicle is moved forward, the end vehicle will exert a greater pull on the second vehicle which will move it in more forward and this additional forward movement of the second vehicle will bring the third vehicle forward. As stated before, the end vehicles have speed controls upon them and, therefore, the end vehicle can be readily brought forward. Therefore, if at least one-fourth of the vehicles on each end are angled outward, although the tension near the end is not as great as near the center, the end vehicles can be more readily brought into alignment by the use of the speed control on the extreme end vehicles.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

SUBJECT MATTER CLAIMED FOR PROTECTION

I claim as my invention:
1. In an irrigation system having
   a. a pipe adapted to have sprinklers placed thereon,
   b. a plurality of vehicles having wheels movingly supporting the pipe,
   c. power means on each vehicle for moving the vehicle,
   d. said pipe connected to a source of water under pressure,
   e. THE METHOD OF KEEPING THE PIPE STRAIGHT AND THE VEHICLES IN ALIGNMENT COMPRISING:
   f. stretching the pipe by angling the wheels on at least one end vehicle outward.
2. In an irrigation system having
   a. a pipe adapted to have sprinklers placed thereon,
   b. a plurality of vehicles having wheels movingly supporting the pipe,
   c. power means on each vehicle for moving the vehicle, d. said pipe connected to a source of water under pressure,
e. THE IMPROVED STRUCTURE IN COMBINATION WITH THE ABOVE COMPRISING:
f. the wheels on the end vehicle angled outward from the pipe so as to tension the pipe.

3. The invention as defined in claim 2 with an additional limitation of
g. the wheels are angled outward at about between 3° to 4°.

4. In an irrigation system having
a. a pipe adapted to have sprinklers placed thereon,
b. a plurality of vehicles including two end vehicles movingly supporting the pipe,
c. each vehicle having wheels,
d. power means on each vehicle for moving the vehicle,
e. said pipe connected to a source of water under pressure,
f. THE IMPROVEMENT IN COMBINATION WITH THE ABOVE COMPRISING:
g. the wheels on both end vehicles angled outward from the pipe so as to tension the pipe.

5. The invention as defined in claim 4 with an additional limitation of
h. the wheels of at least a fourth of the vehicles on one end of the pipe angled outward and the wheels of at least a fourth of the vehicles on the other end of the pipe angled outward.

6. The invention as defined in claim 5 with an additional limitation of
j. the wheels are angled outward at about between 3° to 4°.

7. The invention as defined in claim 5 with an additional limitation of
j. speed control means on each of the end vehicles for controlling the speed to be faster or slower than the remaining vehicles.

8. The invention as defined in claim 7 with an additional limitation of
k. the wheels are angled outward at about between 3° to 4°.

* * * * *